July 7, 1936.    B. A. PROCTOR    2,046,844
INTERMITTENT MOVEMENT FOR FILM HANDLING APPARATUS
Original Filed Jan. 14, 1929

INVENTOR.
BARTON ALLEN PROCTOR
BY Warren Dunham Foster
ATTORNEY.

Patented July 7, 1936

2,046,844

UNITED STATES PATENT OFFICE 2,046,844

INTERMITTENT MOVEMENT FOR FILM HANDLING APPARATUS

Barton Allen Proctor, Larchmont, N. Y., assignor to Kinatome Patents Corporation, a corporation of New York Original application January 14, 1929, Serial No. 332,296. Divided and this application January 6, 1934, Serial No. 705,546

12 Claims. (Cl. 88—18.4)

The present invention is a division from my application Serial No. 332,296, filed January 14, 1929, which upon January 16, 1934, became Patent Number 1,944,035.

The intermittent movement described and claimed herein is adapted for use in any type of film handling apparatus, such as, for example, that described and claimed in my parent application, but it will be readily understood that it may also be used in any apparatus in which it is desirable to feed a perforated ribbon or film intermittently.

My invention provides improved film moving means and film retaining means, preferably in the form of teeth cooperating with the film in the gate in order to give to the film the intermittent motion required to bring successive portions into operative position and to hold the film positively in proper registration for projection or exposure. An object of my invention is to provide film feeding mechanism so designed as to be noiseless when in operation since virtually silent operation is demanded in an instrument which reproduces or records sound. Another object is to provide a simple intermittent film feeding movement which can be inexpensively made and sold as a unit for attachment to film handling apparatus of various kinds. A further object of the invention is to provide an intermittent film feeding mechanism having a plurality of film-moving claw members and means associated therewith to insure that the film is held positively motionless at all times when not being moved by the claw members.

Other objects, advantages and characteristics are apparent from the following description, the attached drawing and the subjoined claims. Although I am showing but one embodiment of my invention, it will readily be understood that I am not limited to one construction as changes can readily be made without departing from the spirit of my invention or the scope of my broader claims.

It will be readily understood by those skilled in the art that my invention may be applied to film handling apparatus generically and in most respects equally well to either a camera, film playing phonograph, projector or so-called talking motion picture apparatus, although in the following description I give as an example of my invention its embodiment in a projector.

A feature of my invention resides in a compact overlapping arrangement of portions of the film moving claw members, which overlapping feature makes for a shorter overall dimension of the film feeding unit. A further feature of my invention resides in a nestable arrangement of the cam followers and teeth of the claw members which makes for a narrower overall dimension of the film feeding unit.

A still further feature of my invention resides in an advantageous combination of a reciprocable film moving claw member with a torsional spring for securing a uniform urging of said claw member away from the film path regardless of the rapid reciprocation of the claw member.

Certain features of the present invention are described in my co-pending application, Serial Number 187,980, filed April 30, 1927, which upon January 16, 1934, became Patent Number 1,944,033.

Figure 1:
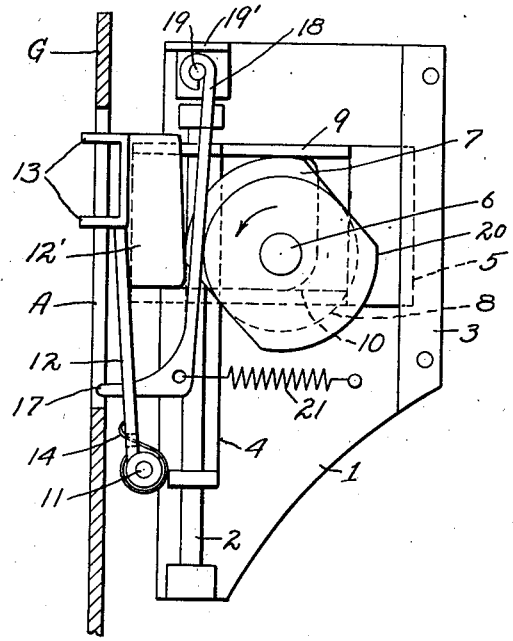
Figure 1 is a right side enlarged elevation of the film moving and retaining elements.
Figure 2:
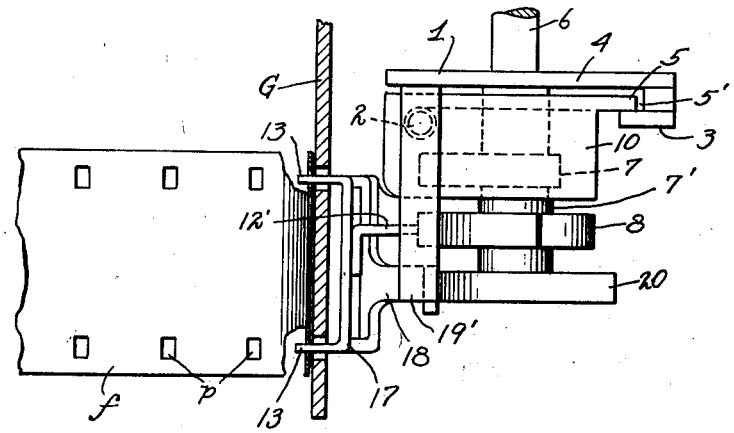
Figure 2 is a top plan view of the same.

As will be readily observed from the drawing, the movement described and claimed herein is constructed as a unit which may be easily placed in operative relation with the film handling machine or removed therefrom for replacement or repair.

Certain reciprocable members of my invention and mounting parts therefor are called in the specification and claims a film feeding reciprocating unit or for brevity, a reciprocating unit to distinguish them from other separately mounted driving members associated with the reciprocating unit.

The movable parts of the movement are mounted upon a plate 1, which may be supported upon a main frame F of the apparatus, or upon any other suitable portion thereof. Projecting at right angles to such frame or otherwise mounted in right angled relation to the plate 1 is a gate section G through which in a suitable aperture A the moving and retaining fingers operate. The usual cooperating section of the gate is not shown, nor is the film handling apparatus shown or described in full, since the subject matter of the present application relates to the intermittent film feeding mechanism and may be employed with any desired type of film handling or other similar apparatus.

Upon the plate 1, upon the left hand side thereof as viewed in the drawing, there may be attached a guide rod 2, and upon the right hand portion thereof as viewed in the drawing, there may be positioned a spaced guide 3 which may be made integral with the plate 1 by a forming operation. Adapted for movement along such guide rod 2, there is provided an intermittent carriage 4 and an extension 5 therefrom which moves within a slot 5' formed between the guide 3 and such plate 1. There may be positioned upon a rotating shaft 6 of the apparatus a heart shaped cam 7 and a pusher cam 8, the latter being preferably mounted upon an extension 7' of the hub of the former.

Any desired means may be employed to give a continuous movement to the shaft 6. Co-acting with the surfaces of cam 7 may be two cam follower flanges 9 and 10 formed by turning upper and lower portions of the extension 5 of the intermittent carriage 4 at right angles to its surface. The surface of the cam 7 may be of any appropriate contour whereby when such cam is revolved, as by the shaft 6, the intermittent carriage is intermittently moved upwardly and downwardly. Pivoted on a stud 11 fastened in the lower portion of the intermittent carriage 4, as by a rod 11, there may be provided a finger carrying plate 12 formed preferably of one piece shaped so as to have four integral forwardly facing film moving fingers or teeth 13. The surface of the pusher cam 8 may bear against the inner edge of a rightwardly extending flange portion 12' of such intermittent fingers plate 12 and the cam 8 may be constructed of such contour as to force the plate 12 to the left, as viewed in the figures, at the moment of cessation of the upward movement of the intermittent carriage 4, and to retain it in such forward position during the full downward movement of such carriage. After the conclusion of such downward movement the moving fingers 13 may be disengaged from the usual perforations p in the film f as by a spring 14, the contour of the cam 8 being such as to permit this movement to the right as viewed in the drawing.

In order that the film f may be held positively in the gate with no danger of it being moved out of frame during the period of exposure, retaining fingers may be provided. Two such fingers 17 may be integrally formed in the end of a retaining fingers plate 18 pivoted on a stud 19 fixed to the plate 1 and having its outer end supported by a bracket 19' fastened on the plate 1. This bracket may be braced in any suitable way, if desired. The fingers may operate through an opening provided in the moving fingers plate 12 or may straddle the lower portion of the plate 12. Bearing against the right hand surface of such retaining fingers plate 18, as viewed in the drawing, may be positioned a retaining fingers pusher cam 20, which may be mounted as upon the extended hub 7' of the heart-shaped cam 7. Such pusher cam 20 may be a duplicate of intermittent fingers pusher cam 8, and with such construction it may be mounted at substantially 180 degrees rotation relatively thereto. It will be understood that the cam 20 may be of any other suitable contour. The retaining fingers plate 18 may be withdrawn from the perforations of the film as by a spring 21.

By reason of the above construction it will be evident that the retaining fingers 17 can be engaged in the perforations p of the film during the period in which the moving fingers 13 are out of such contact. It is preferred that the contour of the cams be such that before the retraction of one set of fingers from the film perforations the other set of fingers will be introduced therein, thus retaining the film under positive and proper control at all times. Also, the preferred arrangement of the cams will be such as to insure that each set of fingers engages with and is disengaged from the film only while the film is held completely motionless by the other set.

It will be readily understood that the assembly of such a movement as described above in operative relation with the apparatus is simple and inexpensive. All of the parts of my movement except the cams can be assembled on the plate 1 as a unit at the factory. Thereafter the attachment of the plate 1 to the main frame of the apparatus can be quickly made and the only other operation is the attachment to the operating shaft of the apparatus of the one cam 7 bearing upon the extension 7' of its hub the cams 8 and 20, both previously positioned angularly and laterally relative to the cam 7. It will also be understood that since the moving and retaining fingers are integrally formed in or attached to pivotally mounted plates which move through arcs which are short relatively to their radii, the fingers have an approximate rectilinear movement and wear upon the film moving mechanism is minimized. It can be seen that by mounting the retaining fingers plate 18 with its teeth below the teeth of the plate 12, these plates will be disposed in an overlapping relation and longer radii for their arcuate movement are thus secured without increasing the over-all height of the film feeding movement. Such over-all height of the film feeding movement represents the area in which the feeding members engage the film, as the word "area" is used in the claims. Moreover, since all fingers may enter or leave the perforations of the film when moving substantially at right angles thereto while the film is pinned motionless, contact between the material surrounding the perforations and such fingers is minimized, thus reducing wear upon both fingers and film.

I claim:

1. In a film feeding unit for a film handling apparatus, a mounting plate, a carriage guide rod supported on said plate, a carriage mounted on said rod for reciprocatory movement parallel to the work path of a film, a claw member pivotally mounted on said carriage for movement about its pivot into engagement with the film, and channel means on said plate for receiving a portion of said carriage, said guide rod and said guiding channel means both being disposed approximately in a plane at a right angle to the plane of the film path for cooperatively guiding said carriage in a plane at right angles to the plane of the film path.

2. In a film feeding unit for a film handling apparatus, a mounting plate at one side of the film path, a reciprocable carriage, instrumentalities on said mounting plate for guiding said carriage in a plane substantially perpendicular to the plane of the work path of the film, a claw member pivotally mounted on said carriage adjacent one end thereof and extending toward the other end thereof for engagement with the perforations in the film, and a film retaining finger mounted on said plate beyond said other end of said carriage from said claw member and extending toward said first named end for movement into engagement with perforations in the film, for holding the latter stationary when it is not being moved by said claw member, said film engaging member and said film retaining finger both being mounted on the same side of the film path.

3. In a film handling apparatus having a stationary member adjacent the path of a perforated film fed through said apparatus, in combination, an auxiliary frame member fixed on said stationary member adjacent said film path, a carriage mounted on said auxiliary frame for reciprocating movement parallel to said film path, a rotatable shaft disposed at substantially right angles to the plane of said carriage, a claw member pivotally mounted on said carriage and movable to engage perforations in the film, a spring normally holding said claw member out of engagement with the film, a cam on said shaft for predeterminedly moving said claw member into engagement with the film, a film retaining member mounted on said auxiliary frame operable for engaging the film and holding it stationary while said claw member is out of engagement with the film, means including a spring and a second cam on said shaft for predeterminedly withdrawing said retainer member from engagement with the film prior to the next feeding movement by said claw member, means including a third cam on said shaft for reciprocating said carriage, and means including an integral hub extension on one of said cams for mounting all of said cams on said shaft as a unit.

4. In a film feeding mechanism for a film handling apparatus, in combination, a mounting frame disposed at one side of the film path and having a carriage mounted for movement therealong, a film-moving claw member having a pivoted mounting supported on said carriage and extending from said mounting in a direction along the film path, a retaining claw member having a pivotal mounting on said frame beyond the free end of said film moving claw member, said retaining claw member extending from its mounting along the film path in the opposite direction to said first named direction past said free end of said film moving claw member, and means for moving each of said claw members into and out of operative engagement with the film in timed relation one to the other, the overlapping of said claw members permiting a reduction in length of said mounting frame along the film path.

5. In a film feeding mechanism for a film handling apparatus, in combination, a mounting frame disposed at one side of the film path and having a carriage reciprocable therealong, a film-moving claw member reciprocable along the film path and having a pivotal mounting on said carriage, said claw member extending from said mounting in a direction along the film path, a film-retaining claw member having a pivotal mounting on said frame adjacent the end thereof farthest from said first named mounting, said retaining claw member extending from its mounting along said film path past the free end of said film-moving claw member, and means for moving each of said claw members into and out of engagement with the film in timed relation one to the other, the positioning of said film-moving and said film-retaining claw members being such that said claw members are always in an overlapping relation, one to the other, irrespective of the extent of reciprocation of said film moving member.

6. In a film feeding mechanism for a film handling apparatus, in combination, a mounting frame disposed at one side of the film path, a film moving member reciprocable along the film path and having a reciprocable mounting carried by said frame, said claw member being pivoted on said mounting for movement toward and away from the film path, and extending from said mounting in a direction along the film path, said claw member including one or more teeth on its free end and a cam follower element disposed between said teeth and said mounting, a film-retaining claw member having a pivotal mounting on said frame for movement toward and away from the film path, said retaining claw member extending from said mounting in a direction opposite to said first named direction past the toothed end of said film-moving claw member, said retaining claw member including integral teeth at its free end and a cam follower between said teeth and its mounting, the teeth of said film-moving member and the teeth of said film-retaining member being disposed in the same planes at the sides of the long axis of the film path, the cam follower element on said film-moving member being disposed alongside said cam follower element on said film-retaining member closely adjacent thereto, and means for moving said claw members toward and away from the film path, said means including two closely spaced cams for operatively engaging said cam follower elements.

7. In an intermittent film feeding mechanism for a film handling apparatus having two coaxial revoluble cams, a carriage reciprocable in a plane adjacent to and parallel to the film path, a film moving claw member pivotally mounted on said carriage and having laterally disposed toothed elements for engaging in perforations in each side of the film, a film retaining member having laterally disposed toothed elements engaging in perforations in each side of the film, said retaining member being pivotally mounted on a stationary pivot, said claw member and said retaining member each having a cam follower element narrower than the distance between its associated laterally spaced toothed elements and extending in an opposite direction past the toothed elements associated with the other cam follower, said claw member and said retaining member being disposed in a nestable relation to each other wherein the narrower cam follower elements of said claw member and said retaining member are disposed alongside each other in closely spaced relation, to be operatively engaged by said closely spaced coaxial cams.

8. In a cam driven film feeding mechanism for a film handling apparatus, having two closely disposed coaxial cams, in combination, a mounting plate positioned at one side of the film path, a reciprocating carriage on said plate, an upwardly extending film moving claw member pivotally mounted on said carriage, a downwardly extending film retaining member pivotally mounted on said plate above said claw member, said claw member and said retaining member having integral overlapping cam follower elements disposed in a closely spaced, substantially parallel relation, whereby the top-to-bottom dimension of said mechanism is decreased and said claw member and said retaining member may be operated by the said closely disposed coaxial cams, thereby effecting a decrease in the thickness of said mechanism.

9. In a film feeding mechanism, in combination, a film moving claw member pivoted at one end and extending therefrom in a direction along the film path, a film-retaining claw member pivoted at one end and extending therefrom along the same side of the film path in a direction opposite to said first named direction past the free end of said film-moving member in an overlapping relation thereto, and means for moving said claw members in timed relation, one to the other, into and out of operative relation to the film, said means including two coaxial cams each separately engaging one of said overlapping claw members at a point between their outer ends.

10. In a motion picture apparatus having an aperture, a film feeding mechanism having a mounting member adjacent said aperture, said mechanism further including, in combination, a film-moving claw member carried by said mounting member and pivoted at one end and extending therefrom in a direction along the film path, a film-retaining claw member pivoted at one end on said mounting member and extending therefrom along the same side of the film path in a direction opposite to said first named direction past the free end of said film-moving member in an overlapping relation thereto, and means for moving said claw members in timed relation, one to the other, into and out of operative relation to the film.

11. In a film feeding mechanism, in combination, a reciprocable film-moving claw member mounted at one end thereof upon said mechanism and extending therefrom in a direction along the film path for reciprocable movement into and out of engagement with a film for feeding the film along said path, a film-retaining claw member mounted at one end thereof upon said mechanism for movement into and out of engagement with the film and extending therefrom along the same side of the film path in a direction opposite to said first named direction, and means for operating said claw members for engaging and disengaging the film, the spacing of each of said claw member mountings in relation to the other thereof and to the length of the arm of each of said members being such that each of said members engages the film within the area in which said other member engages the film whereby said mechanism can be compactly constructed.

12. In a film feeding mechanism for a film handling apparatus, an intermittent movement including a mounting plate, a reciprocable carriage having a plate-like body portion, means for guiding said carriage along the film path, said guiding means including a rod fixed on said mounting plate parallel to the film path and a channel means for receiving an edge of said plate-like body portion for cooperation with said rod, a claw device including an arm member extending along the film path, film engaging teeth carried on one end of said arm, and a pivotal mounting at the other end of said arm on said carriage, said claw device being movable into and out of engagement with the film about said mounting, and a cam follower member carried by said arm member and extending away from the film path in a plane perpendicular thereto.

BARTON A. PROCTOR.